United States Patent [19]

Ten Hove

[11] Patent Number: 5,034,129
[45] Date of Patent: Jul. 23, 1991

[54] MEMBRANE ASSEMBLY

[75] Inventor: Roelf J. Ten Hove, Hardenberg, Netherlands

[73] Assignee: Stork Friesland B.V., Netherlands

[21] Appl. No.: 404,854

[22] Filed: Sep. 8, 1989

[30] Foreign Application Priority Data

Sep. 9, 1988 [NL] Netherlands ............ 8802225

[51] Int. Cl.$^5$ ............................................ B01D 69/04
[52] U.S. Cl. ................................. 210/490; 210/507
[58] Field of Search ................ 210/490, 321.84, 491, 210/507

[56] References Cited

U.S. PATENT DOCUMENTS

| | | | |
|---|---|---|---|
| 3,556,305 | 1/1971 | Shorr | 210/490 |
| 3,563,889 | 2/1971 | Cooper et al. | 210/23 |
| 3,850,203 | 11/1974 | Shobert | 210/490 X |
| 3,993,566 | 11/1976 | Goldberg et al. | 210/321.84 |
| 4,134,742 | 1/1979 | Schell | 210/490 |
| 4,214,994 | 7/1980 | Kitano et al. | 210/490 |
| 4,755,299 | 7/1988 | Bruschke | 210/321.84 X |

FOREIGN PATENT DOCUMENTS

| | | |
|---|---|---|
| 489839 | 1/1930 | Fed. Rep. of Germany . |
| 2196830 | 3/1974 | France . |
| 55-129108 | 10/1980 | Japan . |
| 56-67345 | 6/1981 | Japan . |
| 60-238103 | 11/1985 | Japan . |
| 62-129108 | 6/1987 | Japan . |
| 6915027 | 5/1970 | Netherlands . |
| 239777 | 9/1925 | United Kingdom . |

Primary Examiner—Frank Spear
Attorney, Agent, or Firm—Michael N. Meller

[57] ABSTRACT

The invention relates to a membrane assembly, provided with a carrier which carries a layer of a macromolecular substance with membrane action, said carrier being a composite carrier comprising on the one side a layer (2) having an open, cohesive structure, whereby layer (6) of the macromolecular substance extends into layer (2), and on the other side a supporting layer (3) on the side turned away from layer (6) having membrane action.

The carrier comprises, preferably, completely or partially a knitted or woven textile product. The supporting layer (3) is advantageously a plastic non-woven. The macromolecular substance is expediently a polymer, said substance taking care for the connection of the supporting layer (3) to the remaining parts of the composite carrier.

A device for the production of the present membrane assembly is also described. Said device comprises carrier stock means (13), carrier feed means, application means (16, 19) for the application of a liquid solution of a macromolecular membrane-forming material to the composite carrier (2, 3), carrier positioning means (14a, 14b), carrier support means (15) and membrane assembly discharge means (18). The carrier support means support the carrier in such a way that the solution of a macromolecular membrane-forming material can be brought on the carrier as a homogeneous layer.

14 Claims, 3 Drawing Sheets

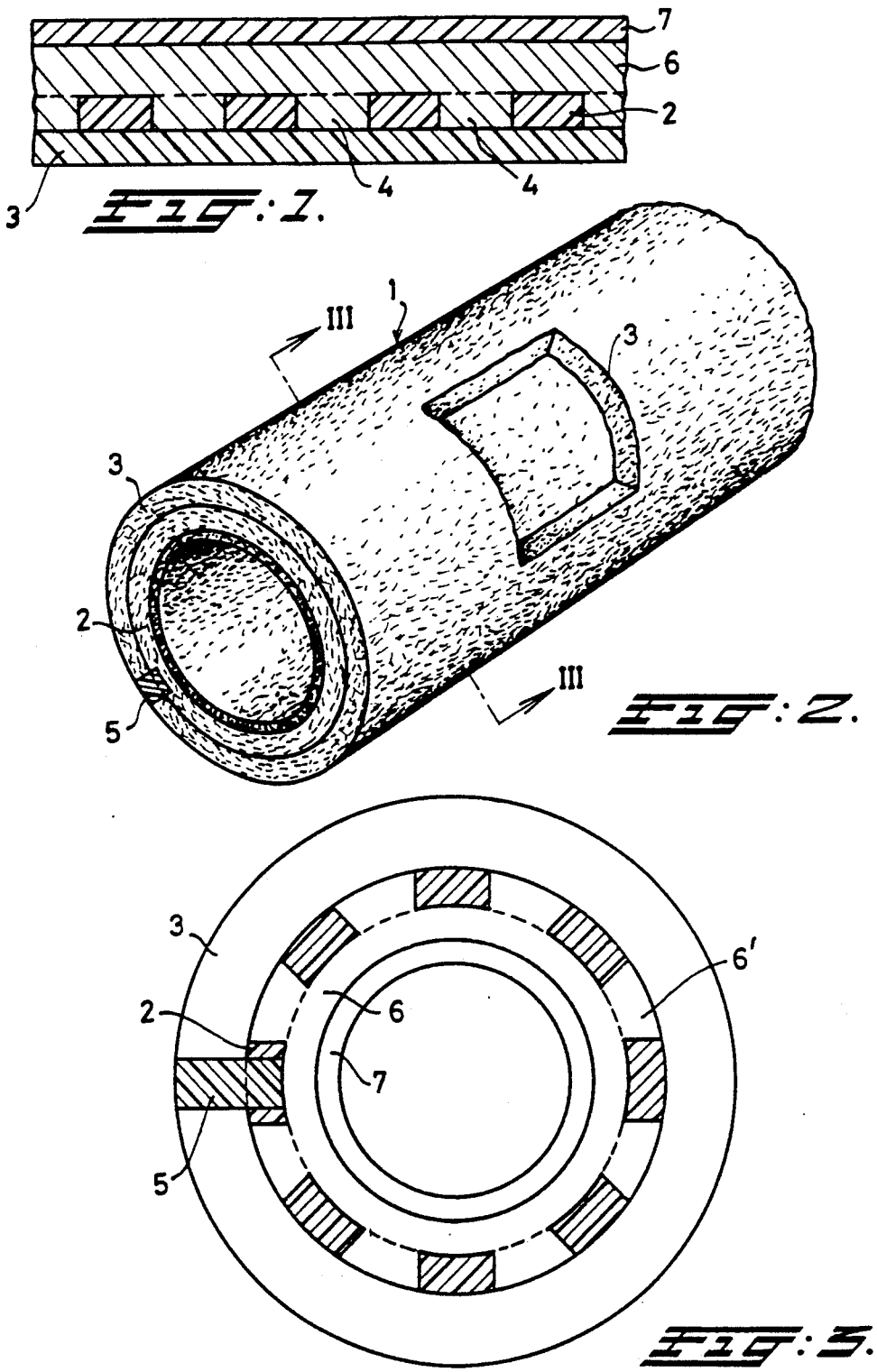

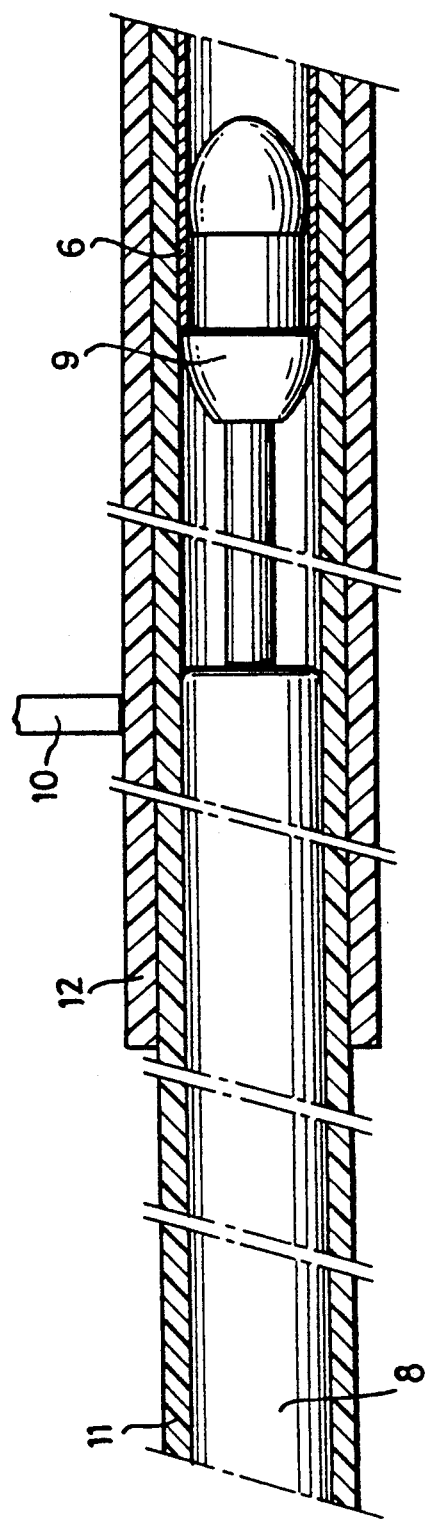

MEMBRANE ASSEMBLY

BACKGROUND OF THE INVENTION

The invention relates to a membrane assembly, provided with a carrier which carries a layer of a macromolecular substance having membrane action.

Such a membrane is known.

A non-woven fabric is normally used as the carrier in the manufacture of membranes. However, it is found in practice that the quality of the membrane depends greatly on slight fluctuations in the quality of the non-woven fabric used as the carrier. In particular, the structure, homogeneity, fibre cohesion, porosity, stretch/draw ratio and the stretch/tensile strength of the non-woven fabric to be used are important.

SUMMARY OF THE INVENTION

Surprisingly, it has now been found that the above-mentioned disadvantages can be eliminated by using a composite carrier comprising a layer having an open, cohesive structure, as well as a supporting layer.

The membrane assembly according to the invention is therefore characterized in that the carrier is a composite carrier, comprising on the one side a layer having an open, cohesive structure, whereby the layer of macromolecular substance extends into the layer having an open, cohesive structure, and on the other side a supporting layer on the side turned away from the layer having membrane action.

The macromolecular substance is preferably a polymer such as, for example, a polysulphone. This polymer has been found to be very suitable for the production of membranes.

Other polymers suitable for this purpose are cellulose acetate, polyether sulphone, polyacrylonitrile, polyhydantoin, polyvinyl chloride, modacryl, polyamide etc.

The composite carrier present in the membrane assembly can have a packing density which increases in the direction towards the surface having no membrane action.

It is remarked that the packing density is understood to mean the volume of the carrier per unity of volume.

Preferably at least a part of the carrier will, however, have a regular, homogeneous structure.

A knitted or woven textile product, in particular a web or knitted arrangement of polyester threads, is particularly satisfactory in practice.

The supporting layer expediently has an asymmetrical structure.

More particularly, the supporting layer comprises a textile product which may or may not be woven or knitted, preferably a non-woven fabric, more particularly a plastic non-woven fabric. It appeared that the fibres forming the fluffy surface can guarantee herewith an extremely good anchoring of the macromolecular substance.

It is pointed out that the use of a double-layer non-woven fabric as the membrane carrier is known from European Patent Specification 0 081 869. The two non-woven fabrics are, however, connected to each other here by means of an adhesive, in particular a hot-melt adhesive. This known membrane carrier is in the form of a tube, in which the non-woven fabrics are fixed relative to each other against displacement by welds, in such a way that the weld of the outer non-woven fabric tube is opposite that of the inner non-woven fabric tube.

In contrast with this known double-layer non-woven fabric, it has been found that good adhesion between the carrier and the supporting layer can be obtained in the absence of an adhesive. Surprisingly, it has in fact been found that the supporting layer by means of the macromolecular substance, which is also used for forming the membrane, is connected with the other parts of the composite carrier through the fact that while it is being formed the polymer solution from which the membrane is made penetrates through the composite carrier with open, cohesive structure and acts as a binding agent. In the production of a tube it is therefore not necessary for the parts of the composite carrier to be fixed to each other by means of welds, as stipulated in the European Patent Specification 0 081 869. More particularly, the welds can be above each other or displaced relative to each other in a tube made of the membrane assembly according to the invention.

It is pointed out that particularly good adhesion can be obtained by disposing the layer with open, cohesive structure on the less smooth side of the non-woven fabric used as supporting layer.

The, on this side, protruding fibres then take care of an additional anchoring.

For comparison, it is pointed out that a membrane comprising a non-woven fabric to which a polysulphone layer is applied can withstand a pressure difference of maximum 0.3 bar during flushing back; a membrane according to the invention, comprising a non-woven fabric provided with a layer with open, cohesive structure and a sulphone layer can, on the other hand, withstand at least 1 bar.

It has also been found that the regular homogeneous structure of the carrier results in the sponge-like polymer layer, such as polysulphone, formed thereon having fewer imperfections, and therefore also being more regular.

It is advantageous for the thickness of the supporting layer to be from 20-60% of the total thickness of the composite carrier, while the membrane assembly is preferably tubular.

The invention also relates to a device for the production of a membrane assembly, comprising carrier stock means, carrier feed means, application means for the application of a liquid solution of a macromolecular membrane-forming material to the composite carrier, carrier positioning means, and membrane assembly discharge means, which is hereby characterized in that the carrier positioning means can hold the composite carrier at a distance from a support in such a way that the abovementioned solution of a macromolecular membrane-forming material can extend into the composite carrier.

The device according to the invention preferably also has means for forming a multilayered carrier and means for fixing said layers relative to each other.

The device also preferably has means for forming a tubular membrane assembly.

The invention will be explained in greater detail below with reference to the accompanying drawings:

DESCRIPTION OF THE DRAWINGS

FIG. 1 shows a membrane assembly according to a first embodiment of the invention;

FIG. 2 shows in perspective a membrane assembly according to the invention, in which parts of the outer tube are broken away;

FIG. 3 shows a cross section along the line II—II;

FIG. 4 shows a device for forming a membrane tube with composite carrier according to the invention;

DESCRIPTION OF THE PREFERRED EMBODIMENTS

Figure 5:
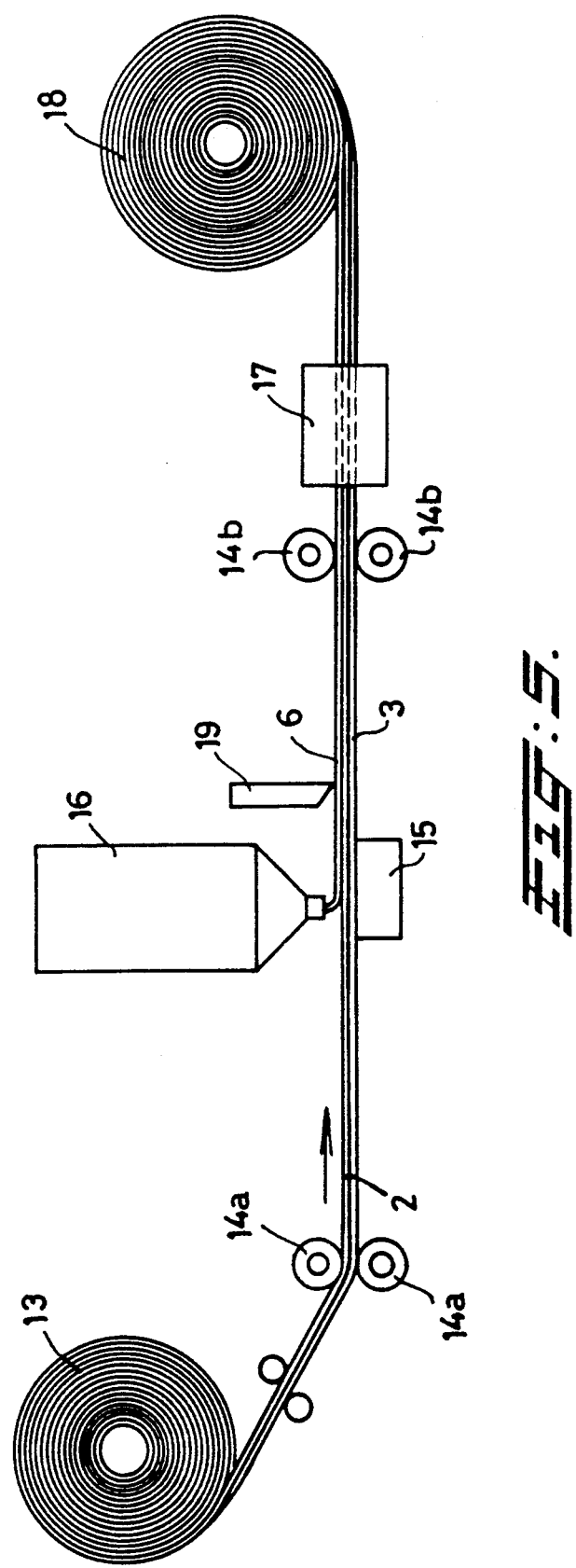
FIG. 5 shows schematically the production of a flat membrane assembly.

Although the invention in FIGS. 2-4 is explained with reference to a tubular membrane assembly, the invention is not limited to a tubular shape, and a flat membrane assembly can also be formed.

FIG. 1 shows a first embodiment of a membrane assembly according to the invention, comprising a layer 2 with open, cohesive structure to which a layer 6 of a macromolecular substance, in particular a polymer, with membrane action is applied. This layer 6 has a sponge-like structure. The membrane material goes partially through apertures such as 4 present in the open structure when being applied to layer 2. Layer 2 is, as indicated, provided on the side turned away from the layer 6, with supporting layer 3.

FIG. 2 and FIG. 3 show a tube with composite carrier according to the invention, comprising an outer tube or supporting layer 3, made of a material which may or may not be woven or knitted, in particular a non-woven fabric, provided with a longitudinal seam weld or spiral weld 5 which is obtained by ultrasonic welding. This weld extends here into the inner tube or layer 2. Depending on the production of the tubular membrane assembly, the weld of the supporting layer can, however, be displaced relative to that of layer 2.

Inside the outer tube or supporting layer 3 is an inner tube or layer 2 of a woven or knitted textile product, such as polyester fibres, about 0.12 mm thick. This layer has an open, cohesive structure.

A membrane layer 6 with surface layer 7 for membrane filtration purposes, made of, for example, cellulose acetate or polysulphone etc., is disposed on the inside of layer 2.

The membrane material goes partially through the open structure of the inner tube or layer 2, as shown by 6', and acts as a binding agent between layer 2 and supporting layer 3, so that the material of these two layers is joined together.

It will be clear that, because the material of the layer 2 is a textile product which may or may not be knitted, this tube prevents loose fibres, which may be released by the supporting layer 3 when it is made of a non-woven material, from penetrating into the membrane layer 6.

Such a non-woven fabric tube has the great advantage that is can be replaced more easily during membrane replacement, on account of the greater rigidity with use of the same quantity of textile product, than a non-woven fabric tube which is made of a non-woven fabric with a thickness corresponding to the thickness of the non-woven fabrics used for the layer 2, or supporting layer 3.

Finally, it should also be pointed out that the resistance to external excess pressure of such tubes is considerably greater than that of the known non-woven fabric tubes with longitudinal seam weld or spiral weld provided with a single non-woven fabric of the same thickness.

Besides, since the membrane material also acts as a binding agent between layer 2 and supporting layer 3, and these two layers are therefore already joined together essentially along their entire surface, the welds required for the tubular shape in the supporting layer 3 and the layer 2 can be disposed at any point relative to each other.

Surprisingly, the relatively open structure of the woven or knitten fabric of the carrier leads to a very smooth weld formed by ultrasonic welding and does not give rise to any damage of the respective membranes, as may occur in a non-woven fabric tube with a single layer, of the same thickness.

As shown in FIG. 4, a membrane in the form of a tube is manufactured according to the invention by placing woven or knitted textile product 11 on a mandrel 8 to form the inner tube or layer 2.

Another layer 12 is then applied to the outside of tube 2 to form the outer or supporting layer 3. The layers 12 and 11 are of polyester or polypropylene fibre material, but other thermoplastic fibre materials can also be used for them, while the thickness of layer 11 is, for example, 0.12 mm, and of layer 12 is, for example, 0.20 mm. Layer 12 can be a non-woven fabric or a woven or knitted fabric.

An ultrasonic sealing element 10 makes a helical or longitudinal weld essentially in layer 12, said weld extending to layer 11 of tube 2, as shown in FIG. 3.

Finally, the tube thus obtained is guided in a membrane application element provided with an internal torpedo-shaped element 9, by means of which a membrane of the desired thickness can be applied to the inside of the tube.

The membrane-forming substance, a polymer solution, penetrates through the open structure of the inner tube 2 into the porous structure of the outer tube 3, and acts here as a binding agent between the two tubes.

The membrane-forming substance is, for example, a polysulphone solution, although solutions of polyamide, modacryl, polyvinyl chloride, polyacrylonitrile, cellulose acetate, polyether sulphone, polyhydantoin, polyether imide, polyvinylidene fluoride and the like can, of course, also be used.

It will be clear to the expert that the invention is not limited to a membrane assembly in the form of a tube, but that a membrane assembly in the form of a sheet can also be produced.

Such a production is shown schematically in FIG. 5.

More particularly the device has carrier stock means 13, such as a reel, and carrier feed means 14. As described above, the composite carrier comprises on the one side a knitted or woven fabric which is in particular made of polyester threads, and on the other side a supporting layer, preferably a non-woven fabric. For the application of the membrane layer on the carrier layer 2, the combination of layer 2 and supporting layer 3 is conveyed from the carrier feed means, and for this purpose carrier positioning means 14a and 14b are present. The membrane is formed on the layer 2, on the side turned away from the supporting layer 3, by applying a liquid solution of a membrane-forming material to the desired thickness from a stock tank 16, whereby layer 3 is supported by a support 15 near stock tank 16. To obtain a membrane layer mainly having the same thickness a spreading apparatus 19 is provided downstream tank 16. The solution of the membrane-forming material will also penetrate into the layer 2. The whole is then passed through a membrane-forming bath 17, in which the finished membrane is formed from the solution applied to the carrier layer 2. Finally, the whole combination is wound onto a reel 18 or is used for further processing.

It has to be remarked that the layers 2 and 3 are wound together on the reel 13 in a way known as such.

What is claimed is:

1. Membrane assembly, provided with a carrier which carries a layer of a macromolecular substance with membrane action, wherein the carrier is a composite carrier comprising on the one side a layer (2) having an open, cohesive structure, whereby the layer (6) of macromolecular substance extends at least partly through the layer having an open, cohesive structure, and on the other side having a supporting layer (3) on the side turned away from the layer having membrane action, said supporting layer (3) at least being partly connected to the remaining parts of the composite carrier by means of the macromolecular substance.

2. Membrane assembly according to claim 1, wherein the macromolecular substance is a polymer.

3. Membrane assembly according to claim 1, wherein the composite carrier has a packing density which increases in the direction towards the surface having no membrane action.

4. Membrane assembly according to claims 1, wherein at least a part of the carrier has a regular, homogeneous structure.

5. Membrane assembly according to claims 1, wherein the carrier completely or partially comprises a knitted or woven textile product, in particular a knitted or woven arrangement of polyester threads.

6. Membrane assembly according to claim 1, wherein the supporting layer (3) is of greater packing density than the remaining part of the carrier.

7. Membrane assembly according to claim 1, wherein the supporting layer (3) has an asymmetrical structure.

8. Membrane assembly according to claim 1, wherein the supporting layer (3) is a textile product.

9. Membrane assembly according to claim 1, wherein the components of the composite carrier are fixed relative to each other by means of a joining weld.

10. Membrane assembly according to claim 1, wherein the thickness of the supporting layer (3) is 20-60% of the total thickness of the composite carrier.

11. Membrane assembly according to claim 1, wherein the membrane assembly is tubular.

12. Membrane assembly according to claim 11, wherein the layer (2) and supporting layer (3) are provided with longitudinal welds which may or may not be displaced relative to each other.

13. Membrane assembly according to claim 8 wherein the textile product is a non-woven fabric.

14. Membrane assembly according to claim 8 wherein the textile product is a plastic non-woven fabric.

* * * * *